G. L. DANFORTH, Jr.
TREATMENT OF SLAG.
APPLICATION FILED JUNE 17, 1911.
1,058,158.
Patented Apr. 8, 1913.
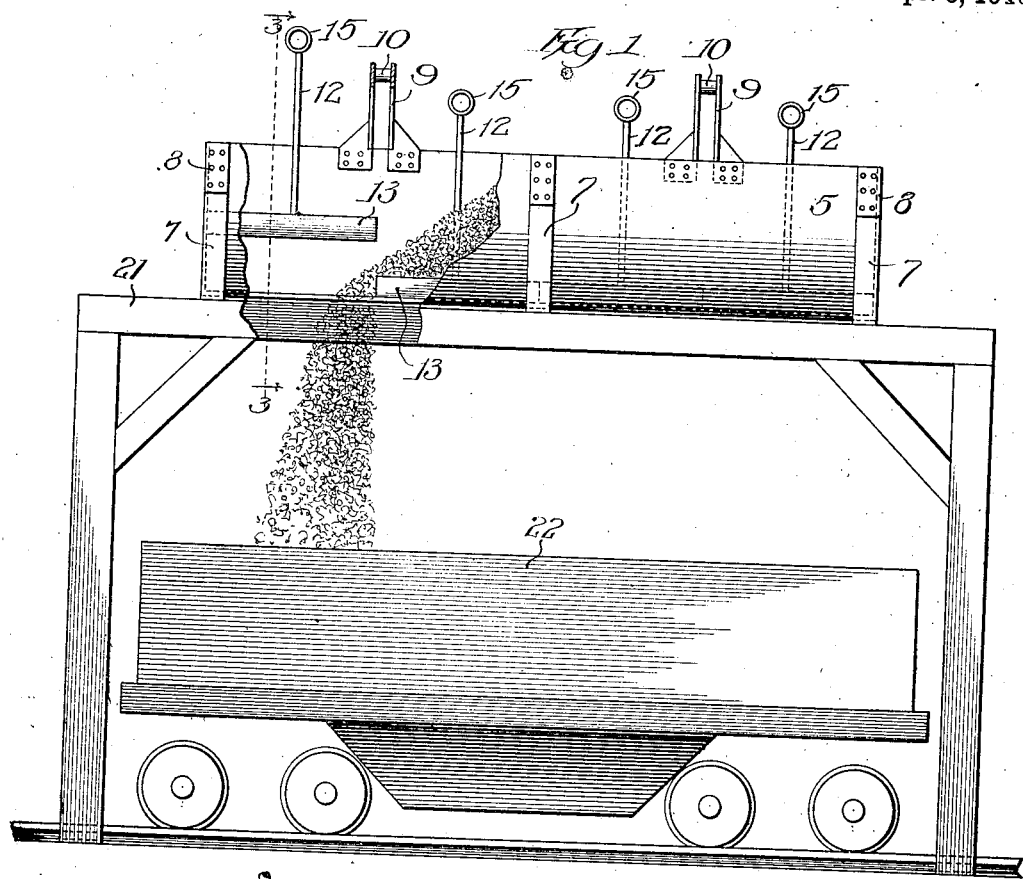
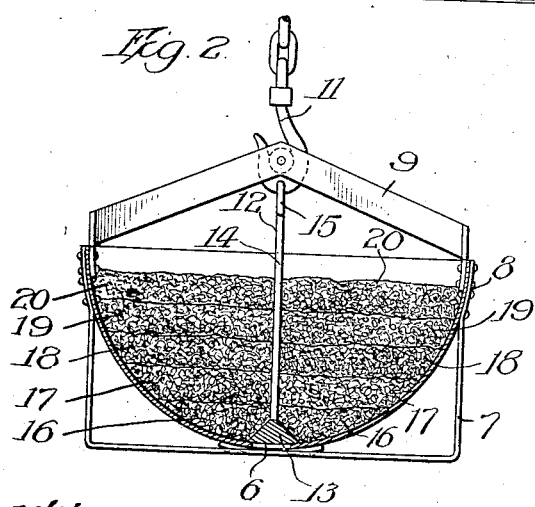
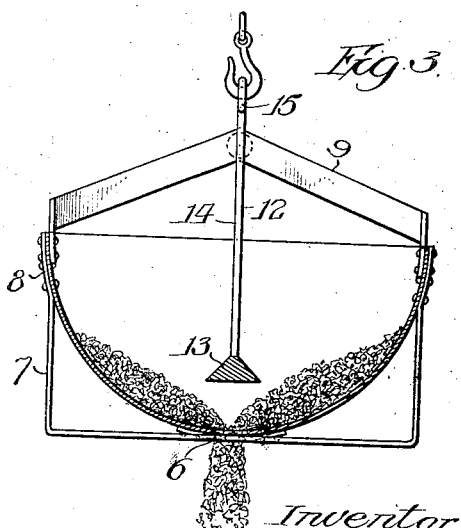
Witnesses:
Inventor:
George L. Danforth Jr.
By Luthicum Belt & Fuller
Attys

UNITED STATES PATENT OFFICE.

GEORGE L. DANFORTH, JR., OF CHICAGO, ILLINOIS.

TREATMENT OF SLAG.

1,058,158. Specification of Letters Patent. Patented Apr. 8, 1913.

Application filed June 17, 1911. Serial No. 633,885.

*To all whom it may concern:*

Be it known that I, GEORGE L. DANFORTH, Jr., a citizen of the United States, residing at Chicago, in the county of Cook and State of Illinois, have invented certain new and useful Improvements in Treatment of Slag, of which the following is a specification.

My invention relates to the treatment of slag or cinder, and is especially, though not exclusively, adapted for use in connection with handling and breaking up slag from open hearth furnaces.

Heretofore it has been customary to pour the liquid slag formed in open hearth furnaces into a metal box or pot which is of such shape and size that the slag solidifies into a large, bulky lump, which must be broken up into small pieces suitable for shipment. This large lump is ordinarily first chilled, and is then taken under a drop, where it is broken up, and the small pieces are then either hand-shoveled or loaded by a grab bucket into cars preparatory to shipment. It will be apparent that there are disadvantages about this method: First, a large equipment of metal boxes or pots is required; second, it is necessary to use transfer cars and other equipment in order to take the lumps of slag to the drop or other device by which it is broken up, and, third, the labor cost for handling the material in this way is high.

In my improved method I provide a receptacle constructed of metal, this receptacle having a large plan area compared to the amount of slag which is to be poured into it at any one time, so that the liquid slag spreads out and instead of forming a large lump which is difficult to break up it forms a thin slab or sheet, preferably about six inches in thickness and of large exposed surface. I preferably apply water to this slab of slag so that the latter is rapidly chilled and small shrinkage cracks are formed. The receptacle is preferably of such depth that it will hold several slabs of slag, one being poured on top of the other. The addition of successive slabs serves further to crack and disintegrate the slabs underneath which have been previously poured. Moreover, by using a large receptacle it is unnecessary to empty it as frequently as would be the case were a small one employed. Contained within the receptacle I prefer to use agitators, by means of which the slag is thoroughly disintegrated and readily flows through a slot in the bottom of the receptacle into a car which is set beneath the platform on which the receptacle is preferably placed. By my improved method it will be clear to those skilled in the art that a great saving is effected in the preliminary cost of equipment, and that the operating cost for labor is also greatly decreased. These and other advantages of my invention will be more readily understood by reference to the accompanying drawings, which represent a preferred form of apparatus by which my method may be carried out, and in which—

Figure 1 is a side elevation partly broken away showing the slag flowing from the receptacle into a suitable car; Fig. 2 is a vertical cross-section through the receptacle showing several layers of slag in position, and, Fig. 3 is a vertical cross-section through the slag-receiving receptacle, on the line 3—3 of Fig. 1.

The slag-receiving receptacle 5 is preferably formed with a curved bottom, and is constructed of iron, steel or other suitable metal. Extending longitudinally along the bottom of the receptacle is a slot 6, the purpose of which will hereafter be apparent. In order to support the receptacle when it is placed on the ground or on a suitable platform, the frame members 7 are attached to the receptacle by means of rivets or bolts 8. In place of using a plurality of frame members, suitable bent plates may be used to inclose the bottom of the receptacle 5, if such are preferred.

Attached to the receptacle 5 are the brackets 9, 9, each of which contains a pin 10 adapted to be engaged by a hook 11 attached to a hoist of a crane. By means of the two brackets 9, 9, it will be evident that the receptacle 5 may easily be handled by a crane in much the same manner as an ordinary ladle for containing molten steel.

Within the receptacle 5 is a plurality of agitators 12, each of which consists of a base 13, preferably triangular in cross-sectional area and adapted to rest within the receptacle 5 and cover the slot 6. Attached to the base 13 is the stem 14 terminating in the ring or eye 15. When all of the agitators 12 are placed in position, the slot 6 in the bottom of the receptacle 5 is covered throughout its entire length by the bases 13 of the agitators.

My improved method of operation may now be readily understood. When a heat is tapped from an open hearth furnace the slag is allowed to flow into the bottom of the receptacle 5, being prevented from flowing through the slot 6 by means of the bases 13 of the agitators 12. The slag which is thus poured into the receptacle forms a layer 16 in the bottom of the latter. In order to cool the slag quickly and cause the formation of shrinkage cracks, I preferably apply water to the surface of the slag. When it is desired to pour additional slag into the receptacle, a second layer 17 is formed, which is preferably cooled in the manner just described. After this, successive layers 18, 19 and 20 may be added, or as many more as the capacity of the receptacle will allow. After the slag within the receptacle 5 has become sufficiently cool to be readily handled, the receptacle is raised by means of a crane, the main hoists of which engage the pins, 10, 10 of the brackets 9, 9, and the receptacle is placed on a platform 21, being prevented from rocking by means of the frame members 7. The main hoists of the crane being removed from the pins 10, 10, one of the auxiliary hoists is attached to the eye 15 of one of the agitators 12, this agitator then being moved up and down, and the slag which is already filled with fine cracks is readily broken up and flows through the slot 6 in the bottom of the receptacle 5 into the car 22, which is placed below the platform 21. All of the agitators 12 are successively moved in the manner just described, and in this way all of the slag in a finely broken up condition is readily delivered into the car 22.

Instead of employing agitators within the receptacle 5 and allowing the slag to pass through the slot 6, I may deposit the various layers of slag as just mentioned, and then tip the receptacle 5 so that all of the slag contained in the receptacle is delivered to the car at once. The cooling action of the water applied to the surface of the layers, and also the subsequent heating action of successively deposited layers, is such that the slag is broken into comparatively small pieces even without the use of the agitators. When the agitators are not employed, the slot in the bottom of the receptacle 5 is, of course, closed.

It will be apparent to those skilled in the art that many changes can be made in the exact method which I have described without departing from the spirit or scope of my invention.

What I claim is:

1. The method of handling slag or other similar friable material, which consists in pouring molten slag over a tension-member, and then pulling such member through the slag, whereby the latter is disintegrated.

2. The method of handling slag or other similar friable material, which consists in pouring molten slag over a plurality of tension-members, and then pulling the latter up through said slag, whereby the latter is disintegrated.

3. The method of handling slag or other similar friable material, which consists in embedding a tension member in the molten slag while such member is stationary, and then separating such slag and member, whereby the slag is disintegrated.

4. The method of handling slag or other similar friable material, which consists in embedding a tension member in the molten slag while such member is stationary, allowing the slag to cool, and then withdrawing such member from the slag, whereby the latter is disintegrated.

5. The method of handling slag or other similar friable material, which consists in forming a bed for the reception of molten slag; placing a tension-member on such bed; pouring the molten slag on said bed over such member while the latter is stationary, and allowing such slag to cool; and then separating said tension-member and slag, whereby the latter is disintegrated.

6. The method of handling slag or other similar friable material, which consists in placing a tension-member on a bed adapted to receive molten slag; pouring such molten slag into such bed; allowing such slag to cool; then pulling said member through the slag, whereby the latter is disintegrated.

7. The method of handling slag or other similar friable material, which consists in placing a tension-member on a bed adapted to receive molten slag; pouring such molten slag upon a portion of said tension member; and then lifting the latter from such slag, by means of a lifting device attached to the exposed portion of such member.

8. The method of handling slag or other similar friable material, which consists in placing a plurality of tension-members on a bed adapted to receive molten slag; pouring such molten slag upon portions of such tension-members; allowing such slag to cool; and then lifting the tension members from such slag by means of a lifting device attached to the exposed portions of such members.

9. The method of handling slag or other similar friable material, which consists in laying a plurality of tension members upon the bottom of a bed adapted to receive molten slag; pouring such slag upon said members and leaving one end of each of same exposed; allowing the slag to cool; and then lifting each of such members from the slag by means of a lifting device attached to such exposed ends.

10. The method of treating slag and the like, which consists in pouring a sufficient amount of liquid slag into a receptacle of relatively large area to form a relatively thin layer of slag, applying a cooling fluid to the surface of said slag, adding successive layers of liquid slag after each preceding layer has solidified, and agitating said slag, whereby it is broken into small pieces, substantially as described.

11. The method of treating slag and the like, which consists in pouring the liquid slag into a receptacle containing agitators, whereby the latter will become embedded in the slag, allowing said slag to cool, and actuating said agitators, whereby the slag will be disintegrated, substantially as described.

12. The method of treating slag and the like, which consists in pouring the liquid slag into a receptacle having an opening in its bottom and containing agitators which cover said opening, whereby said agitators will become embedded in the slag, allowing the slag to cool, and actuating the agitators, whereby the slag will be disintegrated and escape through the opening in the bottom of said receptacle, substantially as described.

GEORGE L. DANFORTH, Jr.

Witnesses:
H. E. CULLEN,
S. P. HELME.